Patented Nov. 28, 1950

2,532,137

UNITED STATES PATENT OFFICE 2,532,137

DIPHENYL-t-6-HYDROXYDEHYDRO-ABIETINOL

Harold H. Zeiss, Fairlawn-Radburn, N. J., assignor, by mesne assignments, to Pierce Laboratory, Inc., New York, N. Y., a corporation of New York No Drawing. Original application October 26, 1946, Serial No. 706,068. Divided and this application April 10, 1950, Serial No. 155,775

1 Claim. (Cl. 260—97)

This invention is concerned with the production of certain new carbinols, more specifically the tertiary rosin alcohol diphenyl-t-6-hydroxydehydroabietinol.

I have found that the above mentioned new compound is valuable for use as an intermediate in making other compounds and also for certain other purposes, such as fungicides and germicides.

The present application is a division of my copending application Serial No. 706,068 filed October 26, 1946 disclosing various new carbinols and a process for making them.

Briefly described, the process of my prior application contemplates production of tertiary rosin alcohols from rosin acids, by first esterifying the carboxyl group of the selected rosin acid. The ester is then treated with a Grignard reagent to form a magnesium halo- complex with the ester, and the said complex is then hydrolyzed to form the tertiary rosin alcohol.

The process is applicable generally to the esters of what are herein referred to as rosin acids. The term "rosin acids" as used herein includes the primary or naturally occurring rosin acids, such as abietic acid, dehydroabietic acid, l-pimaric acid and d-pimaric acid, and also acids derived from the primary rosin acids, by hydrogenation, disproportionation and isomerization. For example, dihydroabietic and tetrahydroabietic acids are formed by hydrogenation of abietic acid. As is known, certain of the primary rosin acids may also be converted to the form of other primary rosin acids (for example, abietic acid may be subjected to disproportionation to produce dehydroabietic acid, and abietic acid itself is formed by isomerization of l-pimaric acid) and the invention is also applicable to acids formed in these ways.

Any of such acids may be esterified with an alcohol such as an alkyl alcohol, and the resultant ester may be employed in accordance with the process in the subsequent reaction with the Grignard reagent. Of especial advantage are the esters formed with methyl alcohol and ethyl alcohol.

The Grignard reagent reacts with the carbonyl group of the ester to form a magnesium halocomplex which, when hydrolyzed forms the tertiary carbinol. Since this characteristic reaction is concerned with the carbonyl group, it will be seen that it is applicable not only to the rosin acid esters above referred to but also to derivatives having substituents introduced either before or after esterification. The groups or classes of derivatives to which the process is applicable include any in which the substituent or substituents are substantially inert with respect to the Grignard reagent, i. e., they will not react with the reagent to destroy it. For example, any substituent containing acidic hydrogen is excluded. As illustrative of derivatives which can be treated are those where the substituent is an alkoxy group.

Any of the Grignard reagents comprising a magnesium salt of an alkyl or aryl halide may be used, especially magnesium salts of primary alkyl halides and of unsubstituted aryl halides, for instance, methyl magnesium iodide and phenyl magnesium bromide. Grignard reagents especially contemplated for use are the magnesium salts of primary alkyl chlorides, bromides and iodides, and magnesium salts of unsubstituted aryl bromides and iodides. The rosin ester is brought into reaction with the Grignard reagent in ethereal solution, and thereafter the reaction product is hydrolyzed.

The present application is concerned with diphenyl-t-6-hydroxydehydroabietinol, which may be produced according to the process above described.

*Example.*—Preparation of diphenyl - t - 6 - hydroxydehydroabietinol

Methyl 6-methoxydehydroabietate (8.6 g.) in 20 ml. of absolute ether was added to a dry ether solution of phenylmagnesium bromide prepared from 8.7 g. of bromobenzene and 1.4 g. of magnesium turnings. The procedure was the same as in Example 3 of Serial No. 706,068. Cleavage of the other linkage occurred during hydrolysis with 10% sulfuric acid, after which the crude hydroxy carbinol was subjected to steam distillation to remove diphenyl and then dried in ether. After removal of the ether the residue was crystallized three times from methanol giving 2.8 g. (24.5%) of transparent prisms of diphenyl-t-6-hydroxydehydroabietinol; M. P. 194–196° C.

I claim:

Diphenyl-t-6-hydroxydehydroabietinol.

HAROLD H. ZEISS.

No references cited.